US005215809A

United States Patent [19]

Hoso et al.

[11] Patent Number: 5,215,809

[45] Date of Patent: Jun. 1, 1993

[54] SIGNATURE PANEL AND PROCESS FOR PRODUCING THE SAME

[75] Inventors: Hidehiko Hoso; Takahiro Fujiu; Takeo Kato; Takao Kondou, all of Tokyo, Japan

[73] Assignee: Toppan Printing Co., Ltd., Tokyo, Japan

[21] Appl. No.: 761,563

[22] Filed: Sep. 18, 1991

[30] Foreign Application Priority Data

Sep. 19, 1990 [JP] Japan .................................. 2-249756

[51] Int. Cl.[5] .............................................. B32B 9/00

[52] U.S. Cl. ................................... 428/195; 428/204; 428/916; 428/915; 428/913; 428/206; 428/207; 428/211; 428/409

[58] Field of Search ............... 428/204, 916, 915, 913, 428/195, 206, 207, 211

[56] References Cited

U.S. PATENT DOCUMENTS

| | | | |
|---|---|---|---|
| 3,545,380 | 11/1969 | Comegys et al. | 428/916 |
| 4,051,295 | 9/1977 | Bernstein | 428/916 |
| 4,092,449 | 5/1978 | Bernstein | 428/29 |
| 4,627,642 | 12/1986 | Peronneau et al. | 428/204 |

FOREIGN PATENT DOCUMENTS

| | | | |
|---|---|---|---|
| 0149542 | 7/1985 | European Pat. Off. . | |
| 0176403 | 4/1986 | European Pat. Off. . | |
| 0250658 | 1/1988 | European Pat. Off. . | |
| 2100682 | 7/1972 | Fed. Rep. of Germany . | |
| 2631246 | 1/1977 | Fed. Rep. of Germany . | |
| 2801015 | 7/1979 | Fed. Rep. of Germany . | |
| 3440653 | 3/1985 | Fed. Rep. of Germany | 428/916 |
| 1216920 | 4/1960 | France . | |
| 2129198 | 10/1972 | France . | |
| 2372476 | 6/1978 | France . | |

*Primary Examiner*—Patrick J. Ryan
*Assistant Examiner*—Abraham Bahta
*Attorney, Agent, or Firm*—Armstrong, Westerman, Hattori, McLeland & Naughton

[57] ABSTRACT

The improved process for producing a signature panel comprises the steps of forming on the writing surface of a panel substrate a printed graphic pattern that will change upon exposure to alcohols, organic solvents, bleaching agents and surfactants, and laminating the other surface of the panel substrate with a thermoplastic resin by extrusion or hot melt coating. According to this process, signature panels can be thermocompressed at comparatively low temperatures not only to roll mills of overprint cards using a polyvinyl chloride sheet as an oversheet base but also to card substrates such as PET sheets, metal sheets and glass sheets without causing any adverse effects on the graphic pattern printed on the writing surface of the panel which will change upon exposure to chemicals.

19 Claims, 2 Drawing Sheets

SIGNATURE PANEL AND PROCESS FOR PRODUCING THE SAME

BACKGROUND OF THE INVENTION

This invention relates to a signature panel to be formed on the surface of cards such as debit cards, credit cards, identification cards and membership cards. The invention also relates to a process for producing such a signature panel.

Debit cards, credit cards, identification cards, membership cards and other cards must be checked for the legitimacy of not only themselves but also their holders. A method of meeting this requirement is to have cardholders sign their names in an area specified as a "signature panel" which is indicated by 12 and which is provided in substantially the center of the card 10 as shown in FIG. 1.

A major problem with cards is that a person who is not the true holder of a card can use it if he tampers the authentic signature of the true card holder.

Various methods have been proposed to prevent the forgery and tampering of cards. One method is using a signature panel that is provided on the surface of a synthetic resin board and which has formed on the writing surface a graphic pattern that will change upon exposure to alcohols, solvents, bleaching agents and surfactants. Several versions of such signature panels have been proposed by American Banknote Co., Ltd., U.S.A., Maccorquodale Co., Ltd., U.S.A., Thomas de larue Co., Ltd., U.S.A., Harrison & Sons, Ltd., U.K., etc. The writing surfaces of the signature panels proposed by those companies are provided with graphic patterns that will change upon exposure to alcohols, solvents (e.g. methyl ethyl ketone, toluene, gasoline and thinners), bleaching agents or surfactants (e.g. detergents) (which are hereunder collectively referred to as "chemicals"). If someone wants to tamper the signature inscribed on such panels, he has to erase it by a certain means and thereafter write a false signature. However, if the authentic signature is erased with chemicals, the graphic pattern provided in the signature panel will simultaneously undergo some change such as dissolution, swelling, fading or change of color, which all make the act of tampering clearly evident.

The signature panels described above have to be bonded to the card substrate. If the card substrate is made of polyvinyl chloride without any surface treatment, there is no need to use solvent-containing adhesives and the signature panels can be bonded to the card substrate merely by thermocompression which is conducted at a fairly high temperature of ca. 150° C. However, if the card substrate has a polyvinyl chloride oversheet coated on the entire surface, accompanied by the formation of a colored graphic pattern (a card using this substrate is often referred to as an "overprint card"), the graphic pattern will deform thermally at elevated temperatures of 150° C. and the signature panel cannot be bonded to the substrate without using an adhesive.

Needless to say, the conventional signature panels cannot be thermocompressed onto card substrates such as polyethylene terephthalate (PET) sheets, metal sheets and glass sheets and an adhesive must be used to bond them together.

However, if an adhesive is applied in order to bond the signature panels to various types of card substrates, the solvents contained in the adhesive will cause a change in the printed graphic pattern on the writing surface of the panels which will change upon exposure to chemicals and this has made it practically impossible to use adhesives for the purpose of bonding signature panels and card substrates.

SUMMARY OF THE INVENTION

The present invention has been achieved under these circumstances and has as an object providing a signature panel that can be thermocompressed at comparatively low temperatures not only to roll mills of overprint cards using a polyvinyl chloride sheet as an oversheet base but also to card substrates such as PET sheets, metal sheets and glass sheets without causing any adverse effects on the graphic pattern printed on the writing surface of the panel which will change upon exposure to chemicals. Another object of the present invention is to provide a process for producing such an improved signature panel.

The first object of the present invention can be attained by a signature panel that has a thermoplastic resin layer provided on the back side of a panel substrate which is opposite the writing surface carrying a printed graphic pattern that will change upon exposure to alcohols, organic solvents, bleaching agents and surfactants.

The second object of the present invention can be attained by a process for producing a signature panel that comprises the steps of forming on the writing surface of a panel substrate a printed graphic pattern that will change upon exposure to alcohols, organic solvents, bleaching agents and surfactants, and laminating the other surface of the substrate with thermoplastic resin by extrusion or hot melt coating.

The second object of the present invention can also be attained by a process for producing a signature panel that comprises the steps of forming on the writing surface of a panel substrate a printed graphic pattern that will change upon exposure to alcohols, organic solvents, bleaching agents and surfactants, roll coating release paper with a thermoplastic resin dissolved in an organic solvent, removing the solvent by drying, and laminating the other surface of the panel substrate with the thermoplastic resin layer by thermal fusion.

The signature panel of the present invention has a thermoplastic resin layer provided on the back side by extrusion or hot melt coating without using any chemicals such as organic solvents. Hence, no change will occur in the printed graphic pattern which would otherwise change upon exposure to chemicals. The thermoplastic resin layer coated on the back side of the substrate of the signature panel exhibits an effective thermal bonding property with respect to both panel substrates and card substrates even if thermocompression is performed at temperatures of up to 150° C. Therefore, the signature panel of the present invention can be bonded to "overprint cards" without causing thermal deformation of the graphic pattern formed on their surface.

According to the first method of the present invention for producing a signature panel, a thermoplastic resin layer can be applied in a desired thickness to the back side of a panel substrate without using organic solvents or other chemicals as coating aids.

According to the second method for producing a signature panel, organic solvents and other chemicals may be used as coating aids and yet a thermoplastic resin layer can be applied in a desired thickness to the back side of a panel substrate without permitting the chemicals to make direct contact with the substrate.

BRIEF DESCRIPTION OF THE INVENTION

DETAILED DESCRIPTION OF THE INVENTION

The preferred embodiments of the present invention are described below with reference to FIGS. 2–6.

Figure 1:
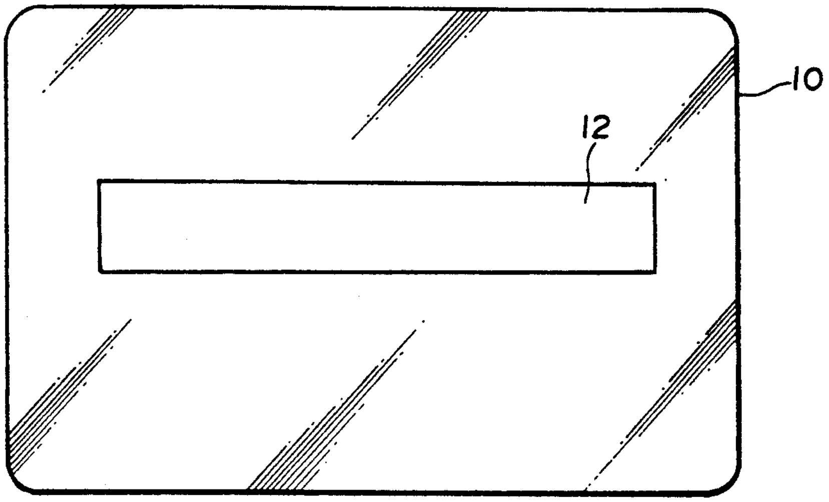
FIG. 1 is a plan view of a card having the signature panel of the present invention provided thereon.
Figure 2:
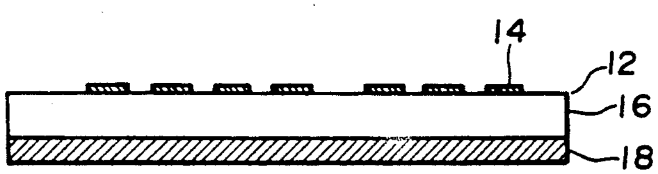
FIG. 2 is an enlarged cross section of the signature panel of the present invention.
Figure 3:
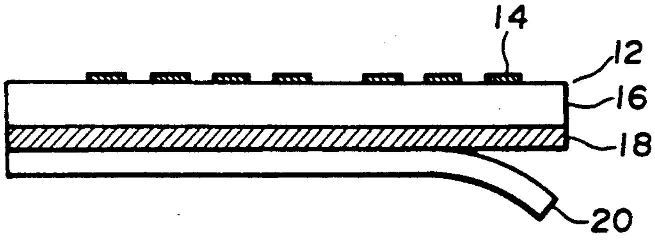
FIG. 3 is an enlarged cross section of a signature panel formed by co-extrusion coating.

FIG. 2 is an enlarged cross section of the signature panel of the present invention. As shown, a printed graphic pattern 14 that will change upon exposure to chemicals is formed on top of a panel substrate 16 and a thermoplastic resin layer 18 is formed on the underside of the substrate 16.

The substrate 16 is made of a material that is highly permeable to alcohols, organic solvents, bleaching agents and surfactants. The substrate is typically made of a paper base that will easily absorb and fix the ink of a fountain pen, a ball-point pen or a felt pen which are used to inscribe signatures, that will adhere strongly to card substrates, and that helps the signature panel become forgery- and tamper-evident.

The printed graphic pattern 14 which will change upon exposure to chemicals may be formed of inks that use oil dyes (solvent dyes) which are highly soluble in solvents, inks that use dyes vulnerable to oxidation bleaching or reduction bleaching, or inks that use binders subject to the attack of solvents. These are not the sole examples of the printed graphic pattern and any other printed patterns may be used as long as they will readily change upon exposure to the chemicals mentioned above. Useful panel substrates are commercially available from American Banknote Co., Ltd., U.S.A., Maccorquodale Co., Ltd., U.S.A., Thomas de larue Co., Ltd., U.S.A., and Harrison & Sons, Ltd., U.K. but details of those proprietary products have not been disclosed.

The thermoplastic resin layer 18 is made of a thermoplastic resin that can be applied by extrusion coating or hot melt coating and which, upon thermocompression at temperatures of up to 150° C., will insure strong adhesion between the paper base of signature panel and card substrates typified by polyvinyl chloride.

The signature panel of the present invention is formed by bonding the paper base having the characteristics described above onto the card substrate without using an adhesive. The present inventor conducted various studies in order to find thermoplastic resins that would meet the bonding conditions described above and found that the following resins had satisfactory bonding properties: urethane resins, vinyl chloride polymers, and mixtures or copolymers thereof; ethylene/vinyl acetate copolymers, ethylene/acrylic acid copolymers, ethylene/acrylic acid ester copolymers, mixtures thereof with a tackifier, and mixtures thereof with a tackifier and a wax; co-polyester resins and co-polyamide resins; and polyethylene or ethylene/vinyl acetate copolymers that have maleic anhydride or other unsaturated carboxylic acids grafted thereto. Among those resins, urethane resins, vinyl chloride polymers and mixtures or copolymers thereof proved to be satisfactory in terms of the strength of bond to signature panels and endurance.

The term "urethane resins" as used herein means basically those linear random alternating block copolymers which contain as major components an OH-terminated long-chain polyol diisocyanate having a molecular weight of 1,000–3,000 and a chain extender such as a short-chain polyol having a molecular weight of up to 500. Thus, depending on the type of long-chain polyol used, urethane resins may be polyester-, polyether- or polycaprolactone-based, all of which can be used in the present invention. Particularly preferred are thermoplastic urethane resins in which the chemical equivalent ratio of an isocyanato group to a hydroxy group is less than unity. Such thermoplastic urethane resins permit the temperature for thermocompression to be lowered to 100°–110° C. so that the possible deterioration of card substrates by thermocompression is sufficiently prevented to increase the processing speed.

Usable vinyl chloride polymers include polyvinyl chloride, a vinyl chloride/vinyl acetate copolymer and a vinyl chloride/vinylidene chloride copolymer. Mixtures of urethane and vinyl choloride polymers as well as copolymers thereof also exhibited good bonding properties. Particularly preferred are those vinyl chloride polymers which contain 20–60 wt % of vinyl chloride.

Layers of those thermoplastic resins can basically be formed on the paper base of signature panel by extrusion coating. However, urethane resins, vinyl chloride polymers, mixtures of urethane and vinyl chloride polymers and copolymers thereof are difficult to effectively provide as single layers in thicknesses not greater than 30 μm. Further, the signature panel of the present invention typically has the thermoplastic resin layer in a thickness of 2–50 μm, preferably 5–30 μm. If the thermoplastic resin layer is thinner than 2 μm, no adequate strength of adhesion will be attained. The strength of adhesion will not be increased any further even if the thickness of the adhesive layer exceeds 50 μm; to the contrary, excess thermoplastic resin will spread beyond the edges of the signature panel during thermocompression and will stick to the hot plates or the card substrate, potentially causing problems in the use of cards.

Figure 5:
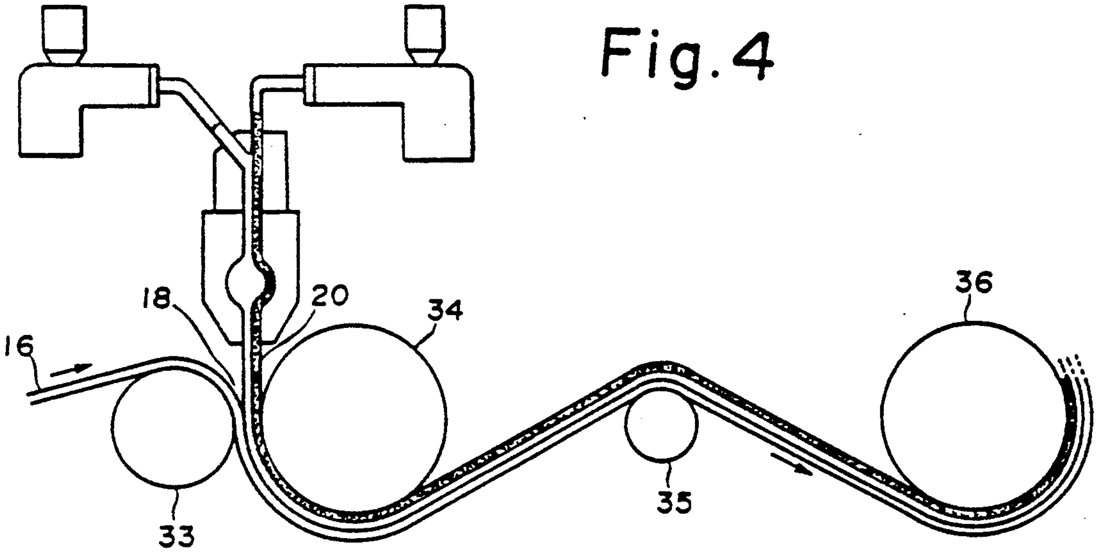
FIG. 5 is a diagram showing how a thermoplastic resin is coated by co-extrusion.

Under these circumstances, it is preferred to perform co-extrusion coating as shown in FIG. 5, in which the thermoplastic resin layer indicated by 18 is extruded simultaneously with a release layer 20 that is made of an easily extrudable polyolefin resin such as polyethylene or polypropylene. By adopting this technique, consistent coating operations can be performed while controlling the thickness of the thermoplastic resin layer within the range of 2–50 μm. The signature panel produced by this method is indicated by 12 in FIG. 3. The co-extrusion coating process comprises the steps of extruding the thermoplastic resin layer 18 in superposition on the release layer 20 so that the two layers will be superposed on a panel substrate 16 being supplied in a web form, shaping the coatings to a predetermined thickness by means of rollers 33 and 34, and winding up the assembly by a takeup roller 36.

After the co-extrusion coating, the polyolefin release layer 20 is stripped from the substrate 16 to yield a signature panel 12 which, as shown in FIG. 2, is an assembly of the paper base and the adhesive thermoplastic resin layer.

Still other examples of useful thermoplastic resins are ethylene/vinyl acetate copolymers, ethylene/acrylic acid copolymers, ethylene/acrylic acid ester copolymers, mixtures thereof with a tackifier, and mixtures thereof with a tackifier and a wax. These thermoplastic resins are satisfactory in terms of the strength of adhesion to signature panels during thermocompression, endurance of signature panels and the ease of thin film formation.

The preferred ethylene/vinyl acetate copolymer has a vinyl acetate content of 3-30 wt %, with the range of 10-20 mol % being more preferred. Illustrative ethylene/acrylic acid copolymers include an ethylene/acrylic acid copolymer and an ethylene/methacrylic acid copolymer, and illustrative ethylene/acrylic acid ester copolymers include an ethylene/ethyl acrylate copolymer and an ethylene/methyl acrylate copolymer.

Exemplary tackifiers that can be used include terpene resins, rosins, modified rosins, aliphatic petroleum resins, aromatic petroleum resins and coumarone-indene resins. These tackifiers are preferably added in amounts of 1-20 wt %. Waxes that can be used include paraffin wax, microcrystalline wax, carnauba wax and polyethylene wax and they are preferably added in amounts of 5-30 wt %.

Figure 4:
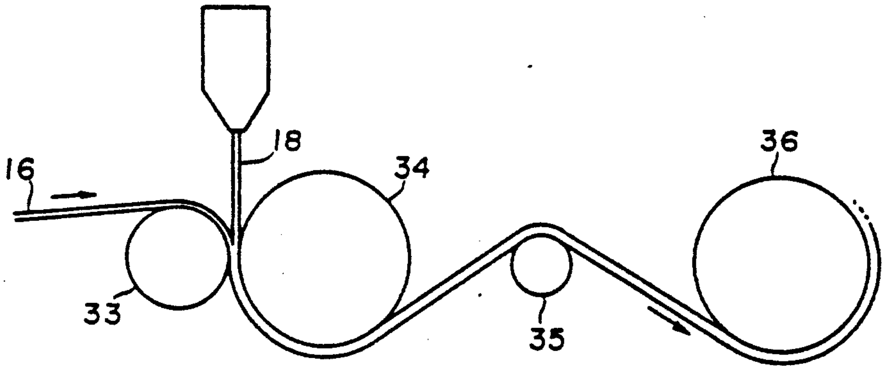
FIG. 4 is a diagram showing how a thermoplastic resin is coated by extrusion.

The thermoplastic resins described above may be applied by extrusion coating as shown in FIG. 4; in which the thermoplastic resin layer 18 is extruded through a nozzle and superposed on a web of a panel substrate 16 being supplied in a web form, the coating is then shaped to a predetermined thickness by means of rollers 33 and 34, and the assembly is guided by a roller 35 to be wound up by a takeup roller 36, whereby the signature panel of the present invention is produced. Mixtures of ethylene/vinyl acetate copolymers with a tackifier and a wax may also be applied by hot melt coating, in which they are melted by heating at 60°-120° C. and roll coated.

Although not shown, the second method of the present invention for producing the signature panel described above comprises the steps of dissolving the thermoplastic resin in an organic solvent serving as a coating aid, applying the solution onto silicone release paper in a predetermined thickness by roll coating, drying the applied coating adequately, superposing it on a panel substrate, bonding them together by heated rollers, and stripping the silicone release paper to obtain the intended signature panel of the present invention. This method has the advantage that organic solvents can be used as coating aids without causing any adverse effects on the printed graphic pattern formed on the signature panel.

Figure 6:
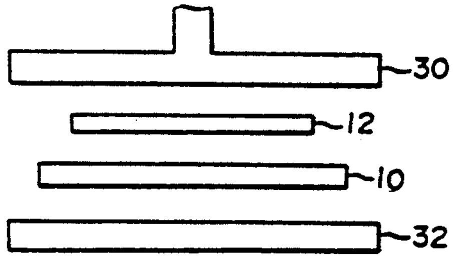
FIG. 6 shows diagrammatically a thermocompression apparatus used to bond the signature panel of the present invention to a card substrate.

The signature panel 12 produced by the above-described processes is slit to a suitable size and bonded to a predetermined area of a card by means of a thermocompression apparatus of the type shown in FIG. 6. This apparatus consists of two hot plates 30 and 32 at least one of which is movable, and a card 10 and the signature panel 12 placed in a predetermined position on the card are held between the hot plates 30 and 32, followed by thermocompression to bond the signature panel 12 to the card 10.

The following examples are provided for the purpose of further illustrating the present invention but are in no way to be taken as limiting.

EXAMPLE 1

An ink for printing a graphic pattern on signature panels was prepared according to the following formula:

| | |
|---|---|
| Sumiplast Blue OA (blue oil dye of SUMITOMO CHEMICAL CO., LTD.) | 10 parts |
| Ethyl cellulose (Ethocell N-7 of Hercules Incorporated) | 7 parts |
| Isopropyl alcohol | 38 parts |
| Ethanol | 50 parts |

Using this ink, a graphic pattern was printed on one side of a signature panel substrate made of wood-free paper (product of Oji Paper Co., Ltd.; 788×1091 mm; 45 kg)

Onto the other side of the substrate, a urethane resin and polypropylene were applied by co-extrusion. The urethane resin was a polyester-based polyurethane in which the chemical equivalent ratio of an isocyanato group to a hydroxyl group was 0.99. The urethane resin coat had a thickness of 10 μm.

Subsequently, the polypropylene layer was stripped and the assembly of the urethane resin coat and the substrate was slit to tapes in a width of 10 mm, whereby signature panels were produced.

Those signature panels were bonded onto cards by thermocompression at 110° C. The thus prepared cards were free from any deterioration of themselves and discoloration of the ink of which the printed graphic pattern was formed on the signature panels. In addition, the signature panels adhered so strongly to the cards that they could not be stripped without causing picking of the paper base. It was therefore clear that those signature panels had satisfactory security against forgery and tampering.

To verify its effectiveness, the present invention as described in Example 1 was compared with a prior art method of bonding signature panels to cards.

COMPARATIVE EXAMPLE 1

As in Example 1, an ink for printing a graphic pattern on signature panels was formulated and a predetermined graphic pattern was printed on one side of wood-free paper.

Subsequently, an adhesive was prepared according to the following formula:

| | |
|---|---|
| Vinyl chloride acetate resin | 15 parts |
| Acrylic resin | 10 parts |
| Methyl ethyl ketone | 38 parts |
| Toluene | 37 parts |

The adhesive was then coated onto the other side of the signature panel substrate. The ink dissolved into the solvents in the adhesive and the graphic pattern deformed and discolored.

EXAMPLE 2

A signature panel (with a printed graphic pattern) available from American Banknote Co., Ltd. was used as a substrate. A mixture in which an ethylene/vinyl acetate copolymer (15 mol % vinyl acetate) and a rosin as a tackifier were incorporated in a ratio of 85:15 was extrusion coated in a thickness of 20 μm on the back side of the substrate. The so treated panel substrate was bonded to a card by thermocompression at 120° C. The card was free from any deterioration of itself and discoloration of the ink of which the printed graphic pattern was formed on the signature panel. In addition, the signature panel adhered to the card with sufficient strength.

To verify its effectiveness, the method of Example 2 was compared with another prior art method of bonding signature panels to cards.

COMPARATIVE EXAMPLE 2

An adhesive was prepared according to the following formula:

| | |
|---|---|
| Vinyl chloride acetate resin | 15 parts |
| Acrylic resin | 10 parts |
| Methyl ethyl ketone | 38 parts |
| Toluene | 37 parts |

The adhesive was coated onto a signature panel of American Banknote Co., Ltd. as in Example 2. The ink used to print the graphic pattern on the signature panel dissolved into the solvents in the adhesive and discoloration of the graphic pattern occurred.

EXAMPLE 3

An adipate ester based linear polyurethane resin (Paraprene P22S of Nippon Miractron Co., Ltd.) was dissolved in a solvent system of dimethylformamide and methyl ethyl ketone to give a solids content of 15%, whereby a polyurethane coating solution was prepared. This solution was roll coated in a thickness of 5 μm onto silicone release paper and the solvents were evaporated by drying. In a separate step, an ink was formulated as in Example 1 and a graphic pattern was printed on a signature panel substrate that was made of wood-free paper. The silicone release paper was then bonded to the signature panel substrate by means of heated rolls at 110° C. Subsequently, the silicone release paper was stripped and the assembly of the substrate and the polyurethane coat was slit to tapes in a width of 10 mm, whereby signature panels were produced.

Those signature panels were bonded onto cards by thermocompression at 110° C. The thus prepared cards were free from any deterioration of themselves and discoloration of the ink of which the printed graphic pattern was formed on the signature panels. In addition, the signature panels adhered so strongly to the cards that they could not be stripped without causing picking of the paper base. It was therefore clear that those signature panels had satisfactory security against forgery and tampering.

As described on the foregoing pages, the signature panel of the present invention has a thermoplastic resin layer formed on the back side which is opposite the writing surface carrying a printed graphic pattern that is highly permeable to alcohols, organic solvents, bleaching agents and surfactants and that will change upon exposure to those chemicals. Because of this structure, the signature panel has high security against the forgery and tampering of signatures. This signature panel can be bonded to card substrates without using adhesives containing solvents and, hence, without causing any change in the printed graphic pattern on the panel. Furthermore, oversheet substrates which have graphic patterns formed in correspondence to overprint cards can be used with the signature panel of the present invention without experiencing any thermal deformation. In addition, the thermoplastic resins that are used in the present invention will exhibit very good bonding properties when they are thermocompressed onto vinyl chloride resin sheets, PET sheets, metal sheets, glass sheets and other card substrates.

According to the process of the present invention for producing the above-described signature panel, the thermoplastic resin can be coated onto the back side of a signature panel substrate in such a way that the panel can be bonded to card substrates without reducing the strength of adhesion. As a further advantage, the thermoplastic resin can be applied to form such a thin layer that it will not spread beyond the edges of the panel, thereby permitting the panel to be neatly positioned on the card substrate.

If necessary, the thermoplastic resin may be applied using organic solvents and other coating aids and yet the printed graphic pattern on the signature panel will not be affected adversely.

What is claimed is:

1. A signature panel comprising a panel substrate having a writing surface carrying a printed graphic pattern that will change upon exposure to organic solvents, bleaching agents and surfactants, and a thermoplastic resin layer provided on the back side of the panel substrate opposite the writing surface.

2. A signature panel according to claim 1 wherein said thermoplastic resin layer formed on the back side of the panel substrate has a thickness of 2–50 μm.

3. A signature panel according to claim 1 wherein said thermoplastic resin is selected from the group consisting of urethane resins, vinyl chloride polymers, urethane copolymers, vinyl chloride copolymers and mixtures thereof.

4. A signature panel according to claim 3 wherein said urethane resin is a linear random alternating block copolymer that contains a hydroxyl terminated long-chain polyol diisocyanate having a molecular weight of 1,000–3,000 and a chain extender as a main component.

5. A signature panel according to claim 3 wherein said urethane resin has a chemical equivalent ratio of an isocyanato group to a hydroxyl group of less than unity.

6. A signature panel according to claim 3 wherein said thermoplastic resin contains vinyl chloride in an amount of 20–60 wt %.

7. A signature panel according to claim 1 wherein said thermoplastic resin contains at least one copolymer selected from the group consisting of ethylene/vinyl acetate copolymers, ethylene/acrylic acid copolymers, and ethylene/acrylic acid ester copolymers.

8. A signature panel according to claim 1 wherein said panel substrate is made of a material that is permeable to alcohols, organic solvents, bleaching agents and surfactants.

9. A signature panel according to claim 7 wherein said thermoplastic resin further contains a tackifier.

10. A signature panel according to claim 9 wherein said thermoplastic resin further contains a wax.

11. A card comprising a card substrate and a signature panel affixed to the card substrate, the signature panel comprising a panel substrate having a writing surface carrying a printed graphic pattern that will change upon exposure to organic solvents, bleaching agents and surfactants, and a thermoplastic resin layer provided on the back side of the panel substrate opposite the writing surface and affixing the panel substrate to the card substrate.

12. A card according to claim 11 wherein said thermoplastic resin layer formed on the back side of the panel substrate has a thickness of 2-50 μm.

13. A card according to claim 11 wherein said thermoplastic resin is selected from the group consisting of urethane resins, vinyl chloride polymers, urethane copolymers, vinyl chloride copolymers and mixtures thereof.

14. A card according to claim 13 wherein said urethane resin is a linear random alternating block copolymer that contains a hydroxyl terminated long-chain polyol diisocyanate having a molecular weight of 1,000-3,000 and a chain extender as a main component.

15. A card according to claim 13 wherein said urethane resin has a chemical equivalent ratio of an isocyanato group to a hydroxyl group of less than unity.

16. A card according to claim 13 wherein said thermoplastic resin contains vinyl chloride in an amount of 20-60 wt %.

17. A card according to claim 11 wherein said thermoplastic resin contains at least one copolymer selected from the group consisting of ethylene/vinyl acetate copolymers, ethylene/acrylic acid copolymers, and ethylene/acrylic acid ester copolymers.

18. A signature panel according to claim 17 wherein said thermoplastic resin further contains at least one material selected from the group of a tackifier and a wax.

19. A signature panel according to claim 11 wherein said panel substrate is made of a material that is permeable to alcohols, organic solvents, bleaching agents and surfactants.

* * * * *